United States Patent
Hodgson

(10) Patent No.: US 10,612,165 B2
(45) Date of Patent: *Apr. 7, 2020

(54) METHOD FOR TREATING REINFORCING FIBRE AND METHOD FOR PRODUCING A REINFORCED COMPOSITE ARTICLE FROM THE TREATED FIBRE

(71) Applicant: MIRteq PTY LTD, Cardiff, NSW (AU)

(72) Inventor: Peter Clifford Hodgson, Speers Point (AU)

(73) Assignee: Spoke Holdings LLC, Fishers, IN (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/440,373

(22) Filed: Feb. 23, 2017

(65) Prior Publication Data

US 2017/0260654 A1   Sep. 14, 2017

Related U.S. Application Data

(63) Continuation of application No. 14/728,798, filed on Jun. 2, 2015, now Pat. No. 9,611,569, which is a continuation of application No. 13/415,575, filed on Mar. 8, 2012, now Pat. No. 9,073,783, which is a continuation of application No. 12/090,609, filed as application No. PCT/AU2006/001536 on Oct. 17, 2006, now Pat. No. 8,153,200.

(30) Foreign Application Priority Data

| Oct. 17, 2005 | (AU) | ................................ 2005905733 |
| Dec. 1, 2005 | (AU) | ................................ 2005906723 |
| Feb. 3, 2006 | (AU) | ................................ 2006900511 |
| May 24, 2006 | (AU) | ................................ 2006902791 |

(51) Int. Cl.

| C08K 9/04 | (2006.01) |
| D01F 11/00 | (2006.01) |
| C08K 3/40 | (2006.01) |
| C03C 25/323 | (2018.01) |
| C08J 5/04 | (2006.01) |
| C08J 5/06 | (2006.01) |
| C08J 5/08 | (2006.01) |
| C08K 7/14 | (2006.01) |
| C03C 25/26 | (2018.01) |
| B29K 101/10 | (2006.01) |
| B29K 105/06 | (2006.01) |

(52) U.S. Cl.
CPC .............. *D01F 11/00* (2013.01); *C03C 25/26* (2013.01); *C03C 25/323* (2013.01); *C08J 5/04* (2013.01); *C08J 5/043* (2013.01); *C08J 5/06* (2013.01); *C08J 5/08* (2013.01); *C08K 3/40* (2013.01); *C08K 7/14* (2013.01); *C08K 9/04* (2013.01); *B29K 2101/10* (2013.01); *B29K 2105/06* (2013.01); *Y10S 428/902* (2013.01); *Y10T 428/2933* (2015.01); *Y10T 428/2938* (2015.01); *Y10T 428/2962* (2015.01)

(58) Field of Classification Search
CPC ....... C08J 5/04; C08J 5/043; C08J 5/06; C08J 5/08; C08J 3/242; C03C 2213/00; C03C 25/10; C08K 9/04; C08K 9/06; C08K 7/02; C08K 7/14; C08K 3/40
USPC ................ 523/527, 200, 205, 214, 217, 444
See application file for complete search history.

(56) References Cited

U.S. PATENT DOCUMENTS

| 2,674,548 A | 4/1954 | Balz |
| 3,081,195 A | 3/1963 | Biefeld et al. |
| 3,398,210 A | 8/1968 | Plueddemann et al. |
| 3,471,439 A | 10/1969 | Bixler et al. |
| 3,649,320 A | 3/1972 | Yates |
| 3,674,542 A | 7/1972 | Vanderbilt |
| 3,928,684 A | 12/1975 | Buning |
| 3,975,362 A | 8/1976 | Kim |
| 4,038,243 A | 7/1977 | Maaghul |
| 4,151,154 A | 4/1979 | Berger |
| 4,158,714 A | 6/1979 | Brichta et al. |
| 4,165,307 A | 8/1979 | Mizuno et al. |
| 4,196,106 A | 4/1980 | Matsuura et al. |
| 4,247,436 A | 1/1981 | Buning et al. |
| 4,370,169 A | 1/1983 | Graham |
| 4,374,177 A | 2/1983 | Hsu et al. |

(Continued)

FOREIGN PATENT DOCUMENTS

| JP | 57-055931 | 4/1982 |
| JP | 03-249274 | 11/1991 |

(Continued)

OTHER PUBLICATIONS

Official Action dated Mar. 10, 2014, in corresponding South Korea Application KR 10-2013-7027112.

*Primary Examiner* — Jane L Stanley
(74) *Attorney, Agent, or Firm* — Barnes & Thornburg LLP

(57) ABSTRACT

The present invention relates to a reinforced composite material and a method for its production. The composite material comprises at least one cured resin having a reinforcing material. Preferably the reinforcing material is a plurality of glass fibres which are treated such that the properties of the interphase substantially surrounding each fibre are substantially equivalent to those of the bulk cured resin. The fibre treatment may be selected from the group consisting of a polymeric coating, a hydrophilic surface coating, a surface coating of a free radical inhibitor, or a reduction in the total surface area of the fibres. The reinforced composite material of the invention provides improved long-term mechanical properties compared to traditional glass fibre reinforced materials.

14 Claims, No Drawings

(56) References Cited

U.S. PATENT DOCUMENTS

| | | |
|---|---|---|
| 4,405,727 A | 9/1983 | Brownscombe |
| 4,457,970 A | 7/1984 | Das et al. |
| 4,465,797 A | 8/1984 | Brownscombe et al. |
| 4,524,040 A | 6/1985 | Hergenrother |
| 4,536,360 A | 8/1985 | Rahrig |
| 4,536,447 A | 8/1985 | Hsu |
| 4,740,538 A | 4/1988 | Sekutowski |
| 4,789,593 A | 12/1988 | Das |
| 4,801,627 A | 1/1989 | Rahrig et al. |
| 5,075,351 A | 12/1991 | Joslyn et al. |
| 5,085,938 A | 2/1992 | Watkins |
| 5,086,101 A | 2/1992 | Garrett et al. |
| 5,130,194 A | 7/1992 | Baker |
| 5,234,997 A | 8/1993 | Oda et al. |
| 5,525,180 A | 6/1996 | Paul et al. |
| 5,538,784 A | 7/1996 | Subramanian |
| 5,948,503 A | 9/1999 | Yamamoto et al. |
| 6,025,073 A | 2/2000 | Piret |
| 2005/0266219 A1 | 12/2005 | Hodgson |
| 2008/0286572 A1 | 11/2008 | Hodgson |
| 2010/0120968 A1 | 5/2010 | Hodgson |
| 2013/0130016 A1 | 5/2013 | Hodgson et al. |

FOREIGN PATENT DOCUMENTS

| | | |
|---|---|---|
| JP | 2001172865 | 6/2001 |
| WO | WO 1999/044955 | 9/1999 |
| WO | WO 2001/068752 | 9/2001 |
| WO | WO 2002/040577 | 5/2002 |

METHOD FOR TREATING REINFORCING FIBRE AND METHOD FOR PRODUCING A REINFORCED COMPOSITE ARTICLE FROM THE TREATED FIBRE

CROSS REFERENCE TO RELATED APPLICATION

This application is a continuation of U.S. application Ser. No. 14/728,798, filed Jun. 2, 2015, which is a continuation of U.S. application Ser. No. 13/415,575, filed Mar. 8, 2012, now U.S. Pat. No. 9,073,783 issued Jul. 7, 2015, which is a continuation of U.S. application Ser. No. 12/090,609, filed Jul. 18, 2008, now U.S. Pat. No. 8,153,200 issued Apr. 10, 2012, which is the National Phase application of International Application No. PCT/AU2006/001536, filed Oct. 17, 2006, which designates the United States and was published in English, and which claims the benefit of AU 2005905733, filed Oct. 10, 2005, AU 2005906723, filed Dec. 1, 2005, AU 2006900511, filed Feb. 3, 2006, and AU 2006902791, filed May 24, 2006. Each of the foregoing related applications, in their entirety, are incorporated herein by reference.

FIELD OF THE INVENTION

The present invention relates to reinforced composite materials, and in particular to fibre reinforced polymer composites. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Fibre reinforced polymer composites are known in the art and are commonly made by reacting a curable resin with a reactive diluent in the presence of a free radical initiator. Typically, the curable resin is an unsaturated polyester resin and the reactive diluent is a vinyl monomer. Reinforcing materials such as glass fibre are often included in the formulations to provide dimensional stability and toughness. Such reinforced composites are used in many key industrial applications, including: construction, automotive, aerospace, marine and for corrosion resistant products.

For traditional glass fibre reinforced polymer composites, the fibre lengths typically range from about 12 mm up to tens of metres in the case of, for example, filament winding. In these glass fibre polymer composites the majority of fibres are held in position by mechanical friction and there is only relatively weak bonding of the fibres to the resin matrix. Therefore, the performance of such polymer composites is largely due to the length of the fibres employed and in these composites there is a discontinuity/gap between the fibres and the resin. Cracks initiated in the resin matrix find it very difficult to jump gaps, therefore in these composites cracks initiated in the resin are usually arrested at the resin boundary and do not reach the glass surface. However, traditional glass fibre composites have a number of shortcomings. For example, it is difficult to "wet" the fibres with the resin prior to curing, and even dispersion of long fibres throughout the composite is difficult, especially for complex parts.

In addition, such traditional glass fibre reinforced polymer composites are limited by their production techniques which generally require manual layering or are extremely limited in the shape and complexity of the moulds.

To overcome these shortcomings, very short glass fibres may be used. VSFPLCs or very short fibre polymerisable liquid composites can product laminate with tensile strengths greater than 80 MPa flexural strength greater than 130 MPa. VSFPLCs are suspension of very short surface treated reinforcing fibres and polymerisable resins/thermoset such as UP resins vinyl functional resins, epoxy resins or polyurethane resins. The length of the fibres are kept very short so that they do not increase the viscosity of the liquid to where the resin fibre mixture is no longer sprayable or pumpable. VSFPLCs can be used to replace standard fibre glass layouts in open and closed moulding applications and also can be used as alternatives to thermoplastics in resin injection moulding and rotation moulding applications.

However, an improvement in the fibre-to-matrix bond is typically required since such very short glass fibres are too short to be mechanically "keyed" into the matrix. Coating the reinforcing fibre with a coupling agent may provide an improvement in the fibre-to-matrix bond. For example, one commonly used coupling agent is Dow Corning Z-6030, which is a bifunctional silane containing a methacrylate reactive organic group and 3 methoxysilyl groups. Dow Corning Z-6030 reacts with organic thermoset resins as well as inorganic minerals such as the glass fibre. Whilst such coupling agents may improve the fibre-to-matrix bond, the usefulness of the reinforced polymer composite is limited since they are prone to embrittlement over time. A product with greater flexibility and toughness is sometimes needed.

An attempt was made to address some of these shortcomings in PCT Patent Application No. PCT/AU01/01484 (International Publication No. WO 02/40577) where the coupling agent was pre-polymerised prior to coating the glass reinforcing fibre to "plasticise the interface". The intention of the pre-polymerised coupling agent was to provide a rubbery interphase between the fibre and the bulk resin and thereby result in product having improved impact resistance and strength. However, long-term embrittlement is still an issue with the above PCT. In Very Short Fibre Polymerisable Liquid Composites there are no air gaps between the fibre and the resin. In VSFPLCs the resin is chemically bonded to the resin matrix and there are no gaps between the resin and the fibres. Cracks initiated in the resin matrix travel directly to the fibre surface. All the energy of the propagating crack is focused at a point on the glass fibre, and the energy is sufficient to rupture the fibre. Abundant evidence for this can be seen on the fracture surface of silane treated fibres. This is especially true for laminates with flexural strengths greater than 100 MPa.

It is an object of the present invention to overcome or ameliorate at least one of the disadvantages of the above-mentioned prior art, or to provide a useful alternative.

DISCLOSURE OF THE INVENTION

According to a first aspect the present invention provides a method for producing a reinforced composite material, comprising: combining at least one curable resin and a plurality of reinforcing fibres; and curing the at least one curable resin, the cured resin adjacent the reinforcing fibres defining an interphase, wherein the reinforcing fibres are treated such that the properties of the interphase are substantially equivalent to those of the bulk cured resin.

In a preferred embodiment the reinforcing fibres are glass fibres having a coupling agent coupled thereto. The glass fibres may be chosen from E-, S- or C-class glass. The glass fibre length is typically between about 100 and 1000 microns and the fibres are preferably evenly dispersed through the resin. The coupling agent comprises a plurality of molecules, each having a first end adapted to bond to the glass fibre and a second end adapted to bond to the resin when cured. Preferably the coupling agent is Dow Corning Z-6030. However, other coupling agents may be used such as Dow Corning Z-6032, and Z-6075. Similar coupling agents are available from De Gussa and Crompton Specialties.

The properties of the interphase which are substantially equivalent to those of the bulk resin may be mechanical properties selected from the group consisting of strength, toughness, and brittleness. Alternatively, or additionally, the properties may be physical or chemical properties selected from the group consisting of density, cross-link density, molecular weight, chemical resistance and degree of crystallinity.

The curable resin(s) preferably includes a polymer and is chosen to have predetermined properties including from one or more of improved tear resistance, strength, toughness, and resistance to embrittlement. Preferably the resin is chosen such that in its cured state it has a flexural toughness greater than 3 Joules according to a standard flexure test for a test piece having dimensions about 100 mm length, 15 mm width and 5 mm depth. Ideally the cured resin having the polymer has a flexural toughness greater than 3 Joules up to 5 years following production.

In preferred embodiments the cured resin is resistant to crack propagation. A preferred cured resin is able to supply fibrils in enough quantity and with enough inherent tensile strength to stabilise the craze zone ahead of the crack, limiting or preventing the propagation of a crack. Ideally the polymer-modified curable resin arrests the crack before it can reach the surface of the glass fibre, or if the craze ahead of the crack reaches the glass it has insufficient energy to rupture the glass fibre surface. Such toughened resins are ideally suited to very short fibre reinforced composites. In addition, such resins provide reduced embrittlement with age. NOTE: The very surface of the glass fibre is nowhere near the strength of the fibre itself due to vastly different cooling rates between the surface of the glass fibre and the body of the glass fibre. This surface is very easily ruptured. To illustrate this one has only to look at the process for making "glue-chipped" decorative glass panels.

The treatment applied to the fibres is preferably a treatment that reduces catalysation of resin polymerisation in the interphase. In one embodiment the treatment applied to the reinforcing fibres is the application of a polymeric coating. Preferably the polymer of the polymeric coating is a monomer deficient (less than about 33% w/w monomer) low activity unsaturated polyester resin having only a relatively moderate amount of unsaturation. Desirably the unsaturated polyester resin is formulated to be substantially hydrophilic.

In another embodiment, the treatment applied to the reinforcing fibres is the application of a hydrophilic surface coating. Reacting the coupling agent (coating the glass fibre) with a hydrophilic agent provides the hydrophilic surface coating. In a preferred aspect the hydrophilic agent is provided by reacting Dow Corning Z-6030 with a tri-hydroxy compound, such as trimetholylpropane, or a tetrahydroxy compound, such as pentaerythritol in the presence of a catalyst, such as tri-butyl tin. The glass reinforcing fibre is sufficiently coated with the hydrophilic surface coating such that the modified fibre is substantially hydrophilic.

In a further aspect of the hydrophilic surface coating embodiment, the treated glass fibre is further treated with an emulsion. The treatment may simply be mixing, however compounding is preferred. The emulsion preferably comprises:
  16.6 parts water;
  100 parts acetone; and
  200 parts polymer,
Optionally the emulsion comprises free radical inhibitors, which generally include hydroquinone (HQ) or hindered amines. The polymer may be a vinyl ester resin, however the polymers referred to above are preferred. In particular, the polymer is a monomer deficient (less than about 33% w/w monomer) low activity unsaturated polyester resin having only a relatively moderate amount of unsaturation. Desirably the unsaturated polyester resin, is formulated to be substantially hydrophilic.

In a further embodiment the treatment applied to the reinforcing fibres is the application of a coating of a free radical inhibitor, such as hydroquinone acetyl acetone, hindered phenols or hindered amines. In yet a further embodiment the treatment applied to the reinforcing fibres is the reduction in the total surface area of the reinforcing fibres.

As discussed above, very short fibre polymerisable liquid composites typically require the use of coupling agents to improve the fibre-to-matrix bond since the fibres are too short to mechanically key into the matrix. The present applicants have found that use of such coupling agents tends to cause embrittlement of the reinforced composite material over time. Others have attempted to mitigate such embrittlement by using a blend of resins whereby at least one of the resins is "rubbery". Other alternatives have been to modify the coupling agent to provide a "rubbery" phase surrounding the fibre, such as disclosed in WO 02/40577. The present invention takes an entirely different approach.

Without wishing to be bound by theory, it is believed that prior art coupling agents coated to the glass fibre act to catalyse resin polymerisation in the interphase, ie the region directly adjacent the glass fibre, thereby forming a brittle interphase over time. The approach of the present invention is to chemically "passivate" the coupling agent coating, thereby attempting to mitigate any effects which the coupling agent may have on the fibre-resin interphase, and enabling the interphase to have substantially equivalent properties to those of the bulk cured resin. However, as the skilled person will appreciate, the degree of passivation should be sufficient to mitigate any effects which the coupling agent may have on the fibre-resin interphase whilst still achieving sufficient bonding of the fibre to the bulk resin.

The applicants have found that the present invention, which is entirely contradictory to the prior art, somewhat surprisingly provides a reinforced composite material which exhibits relatively reduced embrittlement as compared to prior art glass reinforced composite materials whilst retaining properties such as strength, toughness and heat distortion temperature. In particular, the long-term embrittlement issue of prior art composites employing coupled fibres is notably reduced.

According to a second aspect the present invention provides a reinforced composite material comprising: at least one cured resin having a plurality of reinforcing fibres, the cured resin adjacent the reinforcing fibres defining an interphase, the interphase having properties substantially equivalent to those of the bulk cured resin.

According to a third aspect the present invention provides a method for treating a reinforcing fibre for use in a composite material including a curable resin, the method comprising the step of applying one or more of a polymeric coating, a hydrophilic surface coating, or a coating of a free radical inhibitor to the reinforcing fibre such that, in use, the cured resin adjacent the reinforcing fibre defines an interphase, the interphase having properties substantially equivalent to those of the bulk cured resin.

According to a fourth aspect the present invention provides a reinforcing fibre for use in a composite material including a curable resin, the reinforcing fibre having one or more of a polymeric coating, a hydrophilic surface coating, or a coating of a free radical inhibitor applied thereto such that, in use, the cured resin adjacent the reinforcing fibre defines an interphase, the interphase having properties substantially equivalent to those of the bulk cured resin.

According to a fifth aspect the present invention provides a method for reducing embrittlement in a composite material having a curable resin and a plurality of reinforcing fibres dispersed therethrough, the cured resin adjacent the reinforcing fibres defining an interphase, the method comprising the step of reducing the total surface area of the reinforcing fibres thereby providing a corresponding decrease in the quantity of the interphase.

According to a sixth aspect the present invention provides a moulded composite body according to the first aspect of the invention.

According to a seventh aspect the present invention provides a treated reinforcing fibre according to the third aspect of the invention.

According to a eighth aspect the present invention provides a method for moulding a composite comprising the steps of providing a mixture of at least one curable resin and a plurality of reinforcing fibres according to the fourth aspect, applying the mixture to a mould and curing the at least one curable resin.

According to a ninth aspect the present invention provides a moulded composite material when produced by the method according to the eighth aspect.

According to a tenth aspect the present invention provides a liquid curable composite comprising at least one curable resin and a plurality of reinforcing fibres such that, in use, the cured resin adjacent said reinforcing fibres defines an interphase, wherein said reinforcing fibres are treated such that the properties of said interphase are substantially equivalent to those of the bulk cured resin.

According to an eleventh aspect the present invention provides a liquid curable composite comprising at least one curable resin and a plurality of reinforcing fibres, said reinforcing fibres having one or more of a polymeric coating, a hydrophilic surface coating, or a coating of a free radical inhibitor applied thereto such that, when cured, the cured resin adjacent said reinforcing fibre defines an interphase, said interphase having properties substantially equivalent to those of the bulk cured resin.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Other than in the examples, or where otherwise indicated, all numbers expressing quantities of ingredients or reaction conditions used herein are to be understood as modified in all instances by the term "about". The examples are not intended to limit the scope of the invention. In what follows, or where otherwise indicated, "%" will mean "weight %", "ratio" will mean "weight ratio" and "parts" will mean "weight parts".

In describing and claiming the present invention, the following terminology will be used in accordance with the definitions set out below. It is also to be understood that the terminology used herein is for the purpose of describing particular embodiments of the invention only and is not intended to be limiting.

Throughout this specification the terms "fibre" and "fibres" are to be taken to include platelet and platelets respectively. Glass fibres are the most suitable fibres for the invention. However other mineral fibres such as wollastonite and ceramic fibres may also be used without departing from the scope of the invention.

Throughout this specification the terms "property" and "properties" are to be taken to include typical mechanical, physical and chemical properties of polymers and cured resins. For example, mechanical properties are those selected from the group consisting of flexural and/or tensile strength, toughness, elasticity, plasticity, ductility, brittleness and impact resistance. Chemical and physical properties are those selected from the group consisting of density, hardness, cross-link density, molecular weight, chemical resistance and degree of crystallinity.

Throughout this specification the terms "catalyse" and "catalysation" are to be taken to be synonymous with the terms "initiate" and "initiation" in relation to free radical polymerization.

It will also be understood that the term "material" in the present application refers to liquid and solid forms of the fibre/resin mixture. The material itself can be provided in cured form, uncured liquid form or as a separate component e.g. reinforcing fibres and resin separately for mixing on site.

BEST MODE FOR CARRYING OUT THE INVENTION

The present invention provides a method for producing a reinforced composite material and the composite body produced by the method. The method comprises the steps of combining at least one curable resin with a plurality of reinforcing fibres such that the fibres are substantially evenly dispersed throughout the resin, and curing the resin. Preferably the resin is a vinyl ester resin having about 40% of a reactive diluent, such as styrene monomer. However, other monomers may also be used, such as mono- and di- and tri-functional acrylates and methacrylates. Alternatively, the resin may be chosen from unsaturated polyester resins, epoxy vinyl ester resins, vinyl function resins, tough vinyl functional urethane resins, tough vinyl functional acrylic resins, and non-plasticised flexible polyester resins, and combinations thereof.

In preferred embodiments, the fibres are glass fibres chosen from E-, S- and C-class glass having a length of between about 100 and 1000 microns. However, fibres having lengths greater then 1000 microns can also be used. Preferably any sizing agent is removed from the glass fibre prior to its treatment with the coupling agent(s). The preferred coupling agent is Dow Corning Z-6030. However, other coupling agents may be used such as Dow Corning Z-6032 and Z-6075.

The, at least one curable resin may include a polymer, is chosen or modified with such a polymer to have predetermined properties chosen from one or more of improved tear resistance, strength, toughness, and resistance to embrittlement. Preferably the polymer-modified cured resin has a flexural toughness greater than 3 Joules for up to 5 years following production for a test piece having dimensions about 110 mm length, 15 mm width and 5 mm depth subjected to a standard flexure test.

In preferred embodiments the polymer-modified curable resin is resistant to crack propagation. Such polymer-modified resins provide reduced embrittlement with age. Preferably the polymer is a monomer deficient (less than about 30% w/w monomer) low activity unsaturated polyester resin having only a relatively moderate amount of unsaturation. Examples of such polyesters are provided in the tables below. Desirably these polyesters are hydrophilic.

Once the resin is cured to provide the reinforced composite material, the cured resin adjacent and substantially surrounding each of the glass reinforcing fibres defines an interphase, and the reinforcing fibres are treated prior to their addition to the curable resin such that the properties of the interphase are substantially equivalent to those of the bulk cured resin. In one embodiment, the treatment applied to the fibres is a polymeric coating. The polymer of the polymeric coating is preferably the low activity unsaturated polyester resin described above.

As discussed above, without wishing to be bound by theory the applicant believes that a fibre treated with prior art coupling agents acts to catalyse resin polymerisation thereby forming an interphase having substantially different properties to the bulk cured resin. An interphase having highly cross-linked material will have properties vastly different to those of the bulk resin, thereby affecting the mechanical and physical properties of the final cured reinforced composite body. For example, an interphase having highly cross-linked material is inherently more brittle than the bulk resin. During fracture, a propagating crack will relatively easily rupture this brittle interphase and any crack-arresting properties of the resin in the interphase will substantially reduced. Further, as the skilled person will appreciate, the more fibre employed in the composite body the greater the total amount of brittle interphase will result, and the more brittle the composite body will become.

By treating the coupled glass fibre to reduce catalysation of free radical polymerisation, the applicants have been able to reduce the effect of the coupled glass fibre on the interphase such that the interphase has similar properties to the bulk cured resin. In other embodiments, the surface of the glass fibre is treated with a coating of one or more free radical inhibitors, such as hydroquinone or acetyl acetone, hindered phenols and hindered amines. The coating of free radical inhibitor(s) is associated with the surface of the glass fibre such that catalysation of resin polymerisation in the interphase is reduced and the interphase has similar properties to the bulk cured resin.

In a further embodiment, the treatment is a reduction in the total surface area of the fibres. For example, this may be achieved by substituting the glass fibre with a glass fibre having a relatively larger diameter. To explain, glass fibres typically used in glass fibre reinforced composites have diameters between about 5-12 microns. However, the applicants have discovered that use of glass fibres having diameters between about 15-24 microns provides significantly less embrittlement to the final properties of the reinforced composite body, since for a given weight of glass fibre the total surface area is inversely proportional to the increase in fibre diameter. Of course even larger diameter fibres can be used than 24 micron, however, there is a practical working limit of the fibre properties.

In this embodiment, whilst the glass surface still may catalyse resin polymerisation to produce a brittle interphase, the total amount of brittle interphase material is relatively reduced. In addition, to provide a final cured polymer composite with similar mechanical properties, the length of relatively larger diameter glass fibre used is preferably longer than that which would ordinarily be employed for the relatively smaller diameter fibre.

As the skilled person would be aware, combinations of the above-described embodiments may also be employed where appropriate. For example, it would be possible to use glass fibres having a relatively larger diameter and coat the fibre with a free radical inhibitor, or coat the fibre with a polymer as described above.

In further embodiments, the treatment comprises a two-step process whereby the glass fibre is firstly coated with a first agent and then a second agent is reacted with the first agent to provide a substantially hydrophilic surface-modified glass fibre. Preferably the first agent is a coupling agent having a first end adapted to bond to the fibre, and a second end adapted to bond either to the second agent or the resin when cured. In a preferred embodiment, the coupling agent is methacryloxypropyltrimethoxysilane (Dow Corning Z-6030). The second agent comprises the reaction product between the first agent and a tri-hydroxy compound such as trimetholylpropane. However, in alternative embodiments the hydroxy compound is a tetra-hydroxy compound such as pentaerythritol. The reaction of Z-6030 and trimetholylpropane is conducted in the presence of a tin catalyst, such as tri-butyl tin, under appropriate reaction conditions.

The method of treating the glass fibre according to the previous embodiment further includes the step of mixing or compounding the coated reinforcing fibre with an emulsion. The emulsion preferably comprises: 16.6 parts water, 100 parts acetone and 200 parts polymer, wherein the polymer is preferably the hydrophilic low activity unsaturated polyester resin discussed above. The emulsion may also include a hydrophilic free radical inhibitor such as HQ.

EXAMPLES

The present invention will now be described with reference to the following examples which should be considered in all respects as illustrative and non-restrictive.

Treatment of a Glass Fibre with a Hydrophilic Surface Coating

1. E-glass fibres were cut to an average fibre length of 3400 micron and then milled to an average length of 700 micron.
2. The milled glass fibres were cleaned using boiling water, with a strong detergent and with powerful agitation. The detergent was then rinsed from the fibres.
3. 1% w/w of methacryloyloxypropyltrimethoxysilane (Dow Z-6030) was suspended in water at pH 4 and the fibres added to the suspension. The resulting mixture was stirred vigorously at room temperature for 60 minutes.
4. The liquid was then drained from the glass fibres, leaving them still wet with the mixture.
5. The Z-6030-treated fibres were then redispersed in water at a pH of 7.
6. Separately, a solution of Z-6030 was reacted with trimetholylpropane (TMP) in the presence of a tin catalyst (eg tributyl tin) for 15-20 minutes at 110-120° C. to form a Z-6030-TMP adduct having a viscosity of about 1200-1500 cP. Methanol is evolved during the reaction.
7. The Z-6030 treated fibres were then reacted with the Z-6030-TMP adduct to provide a hydrophilic treated fibre. This was achieved by dispersing the Z-6030 treated fibres in water and adding the Z-6030-TMP adduct to the water at a concentration of about 2-3 wt % of fibres. The mixture was stirred together for approximately 10 minutes. The fibres were then separated and then centrifuged to remove excess water. The "wet" fibres were then dried, initially at 30° C. for 3-4 hours, and then heated to between 110 and 125° C. for 5-7 minutes.

8. Separately, an emulsion of polymer was prepared having 200 parts polymers, 100 parts acetone and 16.6 parts water. Preferably the polymer is a hydrophilic resin such as an unsaturated polyester.

9. The hydrophilic treated fibres were then compounded with the emulsified resin until evenly distributed in the rations of about 93 w/w % fibres and 7 w/w % emulsion.

10. The compounded fibre-emulsion mixture was then added to the base resin at approximately 10-45% fibre-emulsion to 90-55% resin.

Table 1 provides flexural strength data for cured clear casts of the commercially available Derakane epoxy vinyl ester resin 411-350 (Ashland Chemicals). These test panels were prepared according to the manufacturers specifications and the resulted in flexural modulus averages about 3.1 GPa, the flexural stress at yield averages about 120 MPa, and the elongation at break averages between about 5 to 6%.

Table 2 shows similar test panels to those of Table 1 but having been thermally aged. Panels are thermally aged by heat treatment at 108° C. for two hours follows by controlled cooling to below 40° C. over about 2 hours. As can be seen, within experimental error, the flexural modulus and flexural stress are about the same post aging. However, the elongation at break has approximately halved, meaning that the panels have substantially embrittled with accelerated aging.

TABLE 1

Flexural strength data for cured (un-aged) clear casts of Derakane 411-350 Epoxy Vinyl Ester Resin.

| Composite | Flexural Modulus (GPa) | Flexural Stress at Yield (MPa) | Elongation at Break (%) |
| --- | --- | --- | --- |
| Test Panel 1 | 2.98 | 112 | 4.9 |
| Test Panel 2 | 3.12 | 119 | 5.7 |
| Test Panel 3 | 3.11 | 123 | 5.6 |
| Test Panel 4 | 3.28 | 132 | 6.0 |

TABLE 2

Flexural strength data for aged clear casts of Derakane 411-350 Epoxy Vinyl Ester Resin.

| Composite | Flexural Modulus (GPa) | Flexural Stress at Yield (MPa) | Elongation at Break (%) |
| --- | --- | --- | --- |
| Test Panel 5 | 3.30 | 117 | 3.0 |
| Test Panel 6 | 3.40 | 121 | 3.1 |
| Test Panel 7 | 3.10 | 131 | 4.1 |
| Test Panel 8 | 3.20 | 123 | 3.6 |
| Test Panel 9 | 3.20 | 127 | 4.2 |

Table 3 provides flexural strength data for aged cured clear casts of Derakane epoxy vinyl ester resin with various polymer additions (discussed below). As can be seen, the resulting flexural modulus averages about 3.3 GPa, the flexural stress at yield averages about 135 MPa, and the elongation at break averages between about 5 to 7%. Comparing the elongation data between Tables 2 and 3 it can be seen that the various polymer additions have substantially reduced aged embrittlement.

TABLE 3

Flexural strength data for aged clear casts of Derakane 411-350 Epoxy Vinyl Ester Resin having 12-15 wt % of a polymer additive.

| Composite | Flexural Modulus (GPa) | Flexural Stress at Yield (MPa) | Elongation at Break (%) |
| --- | --- | --- | --- |
| Test Panel 10 + polymer 1 | 3.20 | 132 | 6.7 |
| Test Panel 11 + polymer 2 | 3.20 | 131 | 4.9 |
| Test Panel 12 + polymer 3 | 3.30 | 136 | 5.7 |
| Test Panel 13 + polymer 4 | 3.50 | 140 | 6.0 |
| Test Panel 14 + polymer 5 | 3.60 | 146 | 6.6 |

The polymers provided in the tables are the condensation products of a polyol and a diacid. The polyol's and diacid's comprising each polymer are provided in Table 4. These polyesters are generally prepared by heating approximately equimolar amounts of diol and acid at temperatures in excess of about 200° C. for periods of about 4 to about 12 hours. Most of the unsaturation is present as fumarate diester groups. These polyesters have acid numbers in the range of from about 15 to about 25. (The acid number is the milligrams of potassium hydroxide needed to neutralize one gram of sample).

A 3-liter, round-bottomed flask equipped with a paddle stirrer, thermometer, an inert gas inlet and outlet and an electric heating mantle. The esterification reactions were conducted in 2 stages. The first stage was reacting the saturated acids in excess glycol, and the second stage was carried out with the addition of the unsaturated acids and remaining glycols. The reactor vessel was weighed between the stages and glycols were added if needed to compensate for any losses. The mixture was heated to between 150 and 170° C. such that water was liberated and the condenser inlet temperature was greater than 95° C.

During the next 2-3 hours the temperature of the mixture was raised to 240° C. The mixture was then cooled to 105° C. and blended with inhibited styrene. The final polyester resin contained 80 percent by weight of the unsaturated polyester and 20 percent styrene.

TABLE 4

Polyesters used to modify the Derakane base resin in Tables 3 and 5.

| Polymer | polyol | diacid | ratio of saturated to unsaturated acids |
| --- | --- | --- | --- |
| Polymer 1 | propylene glycol 4 moles, MP-diol 1.5 moles | terephthalic acid 2 moles, isophthalic acid 1 mole, fumaric acid 2 moles | 3:2 |
| Polymer 2 | diethylene glycol 5.5 moles | terephthalic acid 3 moles, fumaric acid 2 moles | 3:2. Also, a 0.5M excess glycol was maintained at the commencement of the second stage |
| Polymer 3 | diethylene glycol 6 moles, MP-diol 1.5 moles | 1,4-cyclohexane diacid, fumaric acid | 4:3 |
| Polymers 4 and 7 | Nuplex 316/ Terephth 50/50 blend | | |
| Polymer 5 | neopentyl glycol 6.25 moles, propylene glycol 2 moles | 1,4-cyclohexane diacid 4.5 moles, fumaric acid 3 moles | 3:2 |
| Polymer 6 | diethylene glycol | 1,4-cyclohexane diacid 3 moles, fumaric acid 2 moles | 3:2 |

TABLE 4-continued

Polyesters used to modify the Derakane base resin in Tables 3 and 5.

| Polymer | polyol | diacid | ratio of saturated to unsaturated acids |
|---|---|---|---|
| Polymer 8 | neopentyl glycol 6.25 moles, propylene glycol 1 mole | 1,4-cyclohexane diacid 4 moles, fumaric acid 3 moles | 4:3 |

Table 5 provides flexural strength data for Derakane epoxy vinyl ester resin having the stated ratios of resin to glass fibre (in brackets) wherein the glass fibre is treated only with the Z-6030 coupling agent.

TABLE 5

Flexural strength data for aged Z-6030 treated glass fibres in Derakane 411-350 epoxy-vinyl ester resin.

| Composite | Flexural Modulus (GPa) | Flexural Stress at Yield (MPa) | Elongation at Break (%) |
|---|---|---|---|
| Test Panel 15 (2.3:1) | 6.20 | 124 | 0.87 |
| Test Panel 16 (2:1) | 6.70 | 129 | 0.70 |
| Test Panel 17 (1.9:1) | 7.50 | 135 | 0.63 |
| Test Panel 18 (1.7:1) | 8.10 | 142 | 0.60 |
| Test Panel 19 (1.6:1) | 9.00 | 149 | 0.58 |

Table 6 shows flexural strength data for aged test panels of Derakane epoxy vinyl ester resin having about 12-15 weight % of a polymer additive as described above and 45-50 weight % of a treated glass fibre according to the present invention.

TABLE 6

Flexural strength data for aged Derakane 411-350 epoxy vinyl ester resin having 12-15 wt % of a polymer additive and 47 wt % of treated glass fibre

| Composite | Flexural Modulus (GPa) | Flexural Stress at Yield (MPa) | Elongation at Break (%) |
|---|---|---|---|
| Test Panel 20 + polymer 5 | 6.10 | 136 | 2.6 |
| Test Panel 21 + polymer 6 | 6.20 | 133 | 2.2 |
| Test Panel 22 + polymer 6 | 5.90 | 129 | 2.9 |
| Test Panel 23 + polymer 7 | 6.00 | 134 | 3.1 |
| Test Panel 24 + polymer 8 | 6.20 | 135 | 3.4 | according to the present invention, wherein the treatment comprises the hydrophilic surface coating and the emulsified polymer.

In the comparison of the flexural data provided in Table 5 and Table 6, it can be seen that the test panels 20-24 according to the present invention have significantly improved the elongation at break for aged panels, providing a reduction in aged embrittlement.

Table 7 provides flexural strength data for aged test panels of Derakane epoxy vinyl ester resin having the stated ratios of resin to glass fibre (in brackets) wherein the glass fibre is treated with a monomer deficient resin. Test panel 25 is uncoated and panels 26 to 28 are coated. Panels having the coated glass fibre show significantly improved toughness.

TABLE 7

Flexural strength data for aged test panels of Derakane 411-350 epoxy vinyl ester resin having a polymer treated glass wherein the polymer is a monomer deficient resin.

| Composite | Flexural Modulus (GPa) | Flexural Stress at Yield (MPa) | Elongation at Break (%) |
|---|---|---|---|
| Test Panel 25 (2.3:1) | 6.20 | 124 | 0.87 |
| Test Panel 26 (5:1) | 3.80 | 120 | 4.0 |
| Test Panel 27 (5:1) | 3.50 | 115 | 4.0 |
| Test Panel 28 (5:1) | 3.60 | 118 | 4.0 |

INDUSTRIAL APPLICABILITY

The present invention is useful in a wide variety of industries, including: construction, automotive, aerospace, marine and for corrosion resistant products. The reinforced composite material of the invention provides improved long-term mechanical properties compared to traditional glass fibre reinforced materials.

Although the invention has been described with reference to specific examples, it will be appreciated by those skilled in the art that the invention may be embodied in many other forms.

The invention claimed is:

1. A molded composite material, comprising a cured reinforced composite material, wherein the cured reinforced composite material comprises at least one cured resin having:
   i) a polymer having a monomer content of between about 5 to 30% w/w; and
   ii) a plurality of reinforcing fibers coated with a coupling agent;
   wherein:
   a) the at least one cured resin adjacent to said reinforcing fibers defines an interphase; and,
   b) the coated plurality of reinforcing fibers are treated such that the properties of said interphase are substantially equivalent to those of the bulk cured resin.

2. The molded composite material of claim 1, wherein the polymer comprises between 5 to 50% w/w of the at least one cured resin.

3. The molded composite material of claim 1, wherein the at least one cured resin has flexural toughness greater than about 3 Joules when tested in a standard flexure test, the test piece having dimensions about 100 mm in length, 15 mm in width and 5 mm in thickness.

4. The molded composite material of claim 1, wherein the cured reinforced composite material has flexural toughness greater than 3 Joules for up to 5 years.

5. The molded composite material of claim 1, wherein the treatment is a polymeric coating and/or a hydrophilic surface coating applied to said coated plurality of reinforcing fibers.

6. The molded composite material of claim 5, wherein:
   i) the polymer of said polymeric coating is an unsaturated polyester resin having less than about 30% w/w monomer; or
   ii) the hydrophilic surface coating is prepared by reacting a vinyl functional silane with a polyol.

7. The molded composite material of claim 6, wherein the unsaturated polyester resin is provided by reacting a polyol with an acid;
   wherein:
   i) the polyol comprises propylene glycol, methyl propanediol, neopentyl glycol, or diethyleneglycol;

ii) the acid comprises terephthalic acid, isophthalic acid, fumaric acid, or 1,4-cyclohexane diacid; and iii) the unsaturated polyester resin comprises a saturated to unsaturated acid ratio of between about 1.2:1 to 2:1.

8. The molded composite material of claim 1, wherein the coupling agent is a vinyl functional silane.

9. The molded composite material of claim 1, wherein the coupling agent is selected from the group consisting of methacryloxypropyltrimethoxysilane, vinylbenzylaminoethylaminopropyl-trimethoxysilane, and vinyl-tris(acetoxy) silane.

10. The molded composite material of claim 1, wherein the reinforcing fiber of the plurality of reinforcing fibers is a glass fiber.

11. The molded composite material of claim 10, wherein the glass fiber has a length of between about 100 and 1000 microns.

12. The molded composite material of claim 1, wherein the properties comprise:

i) mechanical properties selected from the group consisting of strength, toughness, and brittleness, or a combination thereof;

ii) physical or chemical properties selected from the group consisting of density, cross-link density, chemical resistance, molecular weight, and degree of crystallinity, or a combination thereof; or iii) or a combination of the mechanical, physical, or chemical properties.

13. The molded composite material of claim 1, wherein the cured composite material comprises one or more of the following:

i) a flexural modulus of greater than about 3.5 GPa;

ii) a flexural stress of greater than about 120 MPa; or iii) an elongation at break of greater than about 2%.

14. The molded composite material of claim 1, wherein the treatment:

i) reduces catalyzation of resin polymerization polymerization in the interphase when compared to a fiber not treated; or ii) reduces embrittlement of said interphase when compared to a fiber not treated.

* * * * *